United States Patent
Shim et al.

(10) Patent No.: US 10,647,219 B2
(45) Date of Patent: May 12, 2020

(54) METHOD FOR CONTROLLING FUEL CELL SYSTEM

(71) Applicants: HYUNDAI MOTOR COMPANY, Seoul (KR); KIA MOTORS CORPORATION, Seoul (KR)

(72) Inventors: Jae Young Shim, Yongin-si (KR); Sung Ho Yang, Ansan-si (KR); Jae Hun Jang, Jeollanam-do (KR); Hyo Jin Park, Seongnam-si (KR); Kang Sik Jeon, Hwaseong-si (KR); Young Pin Jin, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 278 days.

(21) Appl. No.: 15/829,358

(22) Filed: Dec. 1, 2017

(65) Prior Publication Data
US 2018/0339603 A1    Nov. 29, 2018

(30) Foreign Application Priority Data
May 25, 2017    (KR) .................. 10-2017-0064857

(51) Int. Cl.
*B60L 58/30*    (2019.01)
*H01M 8/0444*    (2016.01)
(Continued)

(52) U.S. Cl.
CPC .............. *B60L 58/30* (2019.02); *B60L 58/31* (2019.02); *G05D 7/0682* (2013.01);
(Continued)

(58) Field of Classification Search
None
See application file for complete search history.

(56) References Cited

U.S. PATENT DOCUMENTS 8,173,315 B2 *    5/2012   Yoshida ............ H01M 8/04432
                                                    429/443
8,343,679 B2      1/2013   Bono
(Continued)

FOREIGN PATENT DOCUMENTS

JP    2004-179024 A    6/2004
JP    2006-339080 A    12/2006
(Continued)

OTHER PUBLICATIONS

P. Adams, "Hydrogen as an alternative to Helium for gas chromatography," HiQ Application Note—Gas Chromatography, 2012, pp. 1-7.

*Primary Examiner* — Karie O'Neill Apicella
(74) *Attorney, Agent, or Firm* — Morgan, Lewis & Bockius LLP (57) ABSTRACT

A method for controlling a fuel cell system includes steps of: (a) determining whether hydrogen ($H_2$) is detected in an interior space of a stack enclosure in which a fuel cell stack is accommodated; (b) stopping power generation that is performed using the stack when it is determined in step (a) that the hydrogen is detected; (c) opening a purge valve to discharge gases circulating in an anode through the purge valve, and opening a condensate discharge valve to discharge condensate contained in a water trap through the condensate discharge valve; and (d) determining whether the hydrogen discharged through at least one of the purge valve and the condensate discharge valve in step (c) flows back to the interior space based on $H_2$ concentration in the interior space.

20 Claims, 4 Drawing Sheets

(51) Int. Cl.
*G05D 7/06* (2006.01)
*B60L 58/31* (2019.01)
*H01M 8/04664* (2016.01)
*H01M 8/043* (2016.01)

(52) U.S. Cl.
CPC ... *H01M 8/04447* (2013.01); *H01M 8/04679* (2013.01); *H01M 8/043* (2016.02); *H01M 8/04455* (2013.01); *H01M 2250/20* (2013.01)

(56) References Cited

U.S. PATENT DOCUMENTS

| 2009/0047553 | A1 | 2/2009 | Kizaki | |
| 2016/0254556 | A1* | 9/2016 | Zhang | H01M 8/2475 429/429 |

FOREIGN PATENT DOCUMENTS

| JP | 2008-077959 A | 4/2008 |
| JP | 2009-021077 A | 1/2009 |
| KR | 10-0872649 B1 | 12/2008 |
| KR | 10-0974050 B1 | 8/2010 |
| KR | 10-2014-0083739 A | 7/2014 |

* cited by examiner

METHOD FOR CONTROLLING FUEL CELL SYSTEM

CROSS-REFERENCE TO RELATED APPLICATION

This application is based on and claims the benefit of priority to Korean Patent Application No. 10-2017-0064857, filed on May 25, 2017, in the Korean Intellectual Property Office, the disclosure of which is incorporated herein in its entirety by reference.

TECHNICAL FIELD

The present disclosure relates to a method for controlling a fuel cell system.

BACKGROUND

A fuel cell that is a main power supply source of a fuel cell system is a device that generates electricity through oxidation and reduction reactions of hydrogen and oxygen.

High purity hydrogen is supplied from a hydrogen storage tank to an anode of a fuel cell stack (hereinafter referred to as the "stack"), and air in the atmosphere, which is supplied by an air supply device such as an air compressor, is introduced into a cathode of the stack.

At the anode, the oxidation reaction of hydrogen takes place to generate hydrogen ions (protons) and electrons. The protons and the electrons are independently moved to the cathode through a polymer electrolyte membrane and a bipolar plate. In addition, at the cathode, the reduction reaction of the protons and the electrons from the anode with oxygen in the air supplied by the air supply device takes place, forming water and producing electrical energy due to the flow of the electrons.

Meanwhile, to purge hydrogen and discharge condensed water (condensate), a conventional fuel cell system includes a purge valve capable of selectively discharging hydrogen and other gases circulating in the anode to the outside, a water trap in which the condensate discharged from the anode is stored, and a condensate discharge valve capable of selectively discharging the condensate stored in the water trap to the outside. The purge valve and the condensate discharge valve may be also connected to a moist air discharge line discharging moist air discharged from the stack to the outside or a humidifier humidifying air to be supplied to the stack using the moist air. In this configuration, the hydrogen and other gases discharged from the purge valve and the condensate discharged from the condensate discharge valve may be discharged to the outside through the moist air discharge line.

When the hydrogen and other gases discharged from the purge valve are directly discharged to the outside through the moist air discharge line, the concentration of hydrogen in the exhaust gases is increased, thereby violating a regulation on the concentration of hydrogen in the exhaust gases. In addition, the hydrogen and other gases circulating in the anode, as well as the condensate, may be discharged through the condensate discharge valve. When the hydrogen and other gases discharged from the condensate discharge valve are directly discharged to the outside through the moist air discharge line, the aforementioned regulation may also be violated. In order to prevent the violation of the regulation on the concentration of hydrogen in the exhaust gases, the hydrogen purging and the condensate discharge may be performed in a state in which an air discharge valve disposed in the moist air discharge line is closed.

In addition, the moist air discharge line and the humidifier may be connected through the cathode to an air supply line supplying the air to the cathode, and the air supply line may be connected to a stack enclosure accommodating the stack therein by a vent pipe. Here, the vent pipe may be provided to transmit a negative pressure provided by an air compressor disposed in the air supply line to the stack enclosure. The gases leaking from the stack and contained in the stack enclosure may be sucked by the negative pressure provided by the air compressor, and be then discharged to the outside by sequentially passing through the vent pipe, the air supply line, the cathode, the moist air discharge line, and the like.

When power generation is stopped during the operation of the fuel cell system, the air compressor may be stopped. When the hydrogen purging and the condensate discharge are performed in a state in which the air compressor is stopped, the hydrogen may flow backward along the humidifier, the moist air discharge line, the cathode, and the air supply line, and may be introduced into the interior space of the stack enclosure through the vent pipe. In order for the conventional fuel cell system to diagnose whether the hydrogen discharged during the hydrogen purging and the condensate discharge flows back into the interior space of the stack enclosure or the hydrogen directly leaks from the stack into the interior space of the stack enclosure, it may be necessary to disassemble the stack enclosure and the stack. Thus, in the conventional fuel cell system, it may take a long time to diagnose whether the hydrogen discharged during the hydrogen purging and the condensate discharge flows back into the stack enclosure, and the assembly and disassembly of the stack enclosure and the stack may lead to a secondary failure.

SUMMARY

The present disclosure has been made to solve the above-mentioned problems occurring in the prior art while advantages achieved by the prior art are maintained intact.

An aspect of the present disclosure provides a method for controlling a fuel cell system that can diagnose whether hydrogen flows back into a stack enclosure when purging the hydrogen and discharging condensate, without the need of assembly and disassembly of the stack enclosure and a stack.

Another aspect of the present disclosure provides a method for controlling a fuel cell system that can remove hydrogen flowing back into the stack enclosure when purging the hydrogen and discharging the condensate, without the need to stop the fuel cell system.

According to an aspect of the present disclosure, a method for controlling a fuel cell system includes steps of: (a) determining whether hydrogen ($H_2$) is detected in an interior space of a stack enclosure in which a fuel cell stack is accommodated; (b) stopping power generation that is performed using the stack when it is determined in step (a) that the hydrogen is detected; (c) opening a purge valve to discharge gases circulating in an anode through the purge valve, and opening a condensate discharge valve to discharge condensate contained in a water trap through the condensate discharge valve; and (d) determining whether the hydrogen discharged through at least one of the purge valve and the condensate discharge valve in step (c) flows back to the interior space based on $H_2$ concentration measured in the interior space.

Step (a) may be performed by determining whether the hydrogen is detected a predetermined number of times or more.

Step (b) may be performed by stopping supply of the hydrogen to the anode and stopping supply of air to a cathode.

Step (c) may be performed by intermittently opening the purge valve a predetermined number of times, and intermittently opening the condensate discharge valve a predetermined number of times.

Step (d) may be performed by determining whether the measured $H_2$ concentration is lower than a predetermined dangerous concentration.

The method may further include step (e) of stopping the fuel cell system when it is determined in step (d) that the measured $H_2$ concentration is higher than or equal to the predetermined dangerous concentration.

Step (e) may be performed by warning that the measured $H_2$ concentration is higher than or equal to the predetermined dangerous concentration, using at least one of display devices provided in the fuel cell system.

The method may further include step (f) of determining whether the measured $H_2$ concentration exceeds a predetermined safety concentration when it is determined in step (d) that the measured $H_2$ concentration is lower than the predetermined dangerous concentration, wherein the predetermined safety concentration may be lower than the predetermined dangerous concentration by a predetermined ratio.

The method may further include step (g) of determining whether the measured $H_2$ concentration exceeds a predetermined boundary concentration while limitedly driving an air compressor within a predetermined reference driving time to allow the hydrogen to be discharged from the interior space due to a negative pressure provided by the air pressure when it is determined in step (f) that the measured $H_2$ concentration exceeds the predetermined safety concentration, wherein the predetermined boundary concentration may be higher than the predetermined safety concentration by a predetermined ratio, and be lower than the predetermined dangerous concentration by a predetermined ratio.

The method may further include step (h) of determining whether an actual power generation stop time taken from the beginning of step (b) to the present time is less than a predetermined reference power generation stop time when it is determined in step (f) that the measured $H_2$ concentration is lower than or equal to the predetermined safety concentration or when it is determined in step (g) that the measured $H_2$ concentration is lower than or equal to the predetermined boundary concentration, and step (f) may be performed again when it is determined in step (h) that the actual power generation stop time is less than the reference power generation stop time.

The method may further include step (i) of restarting the power generation that is performed using the stack when it is determined in step (h) that the actual power generation stop time is greater than or equal to the reference power generation stop time.

The method may further include step (j) of recording an actual driving time for which the air compressor is driven during the actual power generation stop time, after step (i).

The method may further include step (k) of storing the actual driving time recorded in step (j) as a reference driving time.

The method may further include step (l) of stopping the fuel cell system when it is determined in step (g) that the measured $H_2$ concentration exceeds the predetermined boundary concentration.

The method may further include step (m) of individually recording an actual power generation stop time taken from the beginning of step (b) to the present time, and an actual driving time for which the air compressor is driven during the actual power generation stop time, after step (l).

The method may further include steps of: (n) determining whether the actual power generation stop time recorded in step (m) is less than a predetermined reference power generation stop time; and (o) storing the actual power generation stop time as the reference power generation stop time, and storing the actual driving time as a reference driving time, when it is determined in step (n) that the actual power generation stop time is less than the reference power generation stop time.

The method may further include step (p) of storing the actual driving time as the reference driving time when it is determined in step (n) that the actual power generation stop time is greater than or equal to the reference power generation stop time.

In step (a), the determining whether the hydrogen is detected may be performed for a predetermined detection time using a hydrogen sensor provided in the stack enclosure.

In step (c), opening time and opening degree of the purge valve may be determined according to the $H_2$ concentration measured in the anode, and opening time and opening degree of the condensate discharge valve may be determined according to a level of the condensate in the water trap.

In step (d), the predetermined dangerous concentration may be set to be lower than an ignitable concentration with respect to a hydrogen ignition probability.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
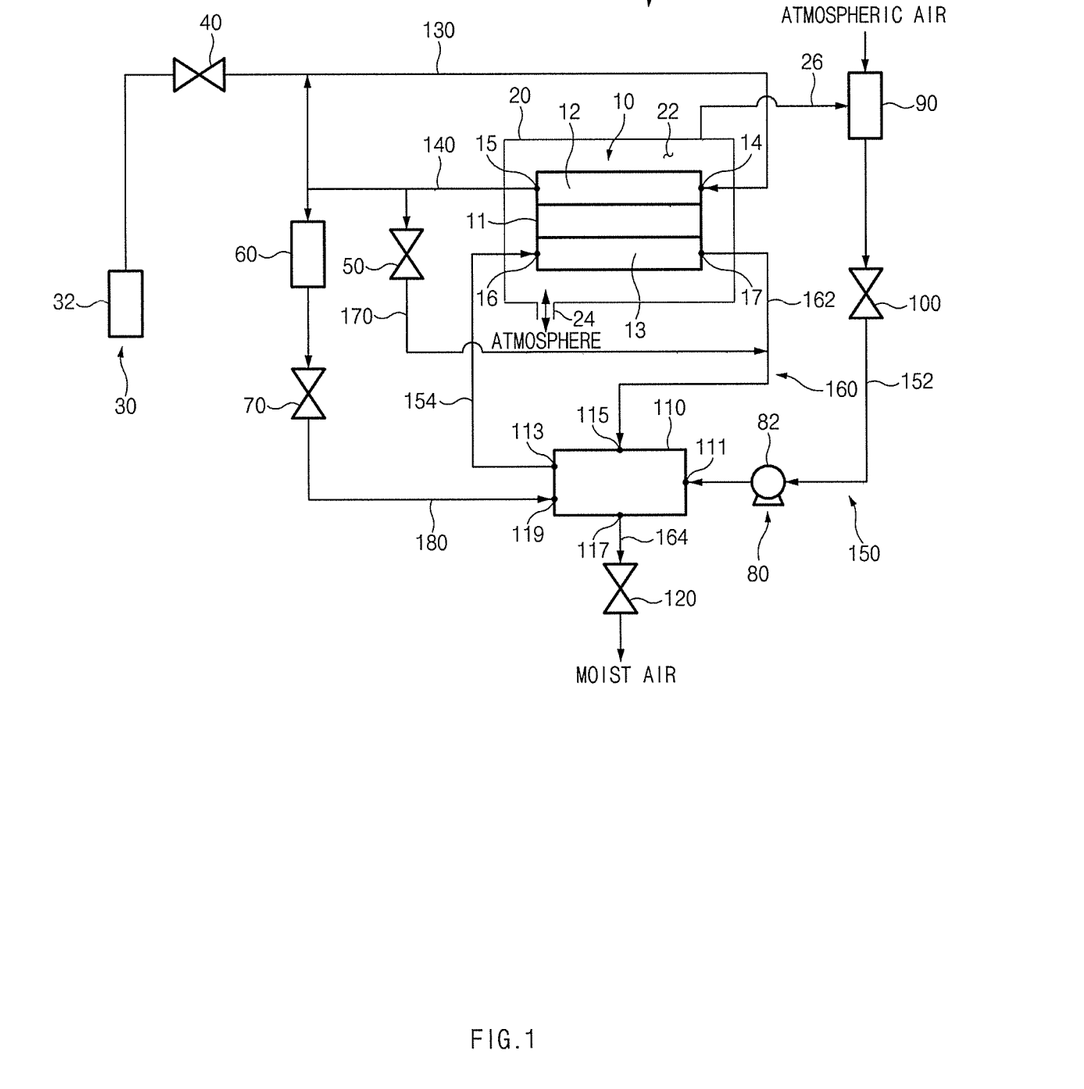
FIG. 1 illustrates a configuration of a fuel cell system of an embodiment of the present disclosure.

FIG. 1 illustrates the configuration of a fuel cell system.

The present disclosure relates to a method for controlling a fuel cell system (hereinafter also referred to as "the fuel cell system control method") that can diagnose whether hydrogen ($H_2$) flows back into an interior space 22 of a stack enclosure 20 during hydrogen purging and condensate discharge, and detect the degree of backflow of hydrogen. Hereinafter, referring to FIG. 1, the configuration of a fuel cell system 1, to which the present inventive concept is applied, will be described.

The fuel cell system 1 includes a fuel cell stack 10 (hereinafter referred to as "the stack 10"), a stack enclosure 20 in which the stack 10 is accommodated, a hydrogen supply device 30, a hydrogen supply valve 40, a purge valve 50, a water trap 60, a condensate discharge valve 70, an air supply device 80, an air filter 90, an air supply valve 100, a humidifier 110, and an air discharge valve 120. Applications of the fuel cell system 1 are not particularly limited. For example, the fuel cell system 1 may be applied to a fuel cell vehicle including a motor which runs on electricity produced by the stack 10.

The stack 10 includes a polymer electrolyte membrane 11, an anode 12 in which an oxidation reaction of hydrogen takes place to generate hydrogen ions (protons) and electrons, and a cathode 13 in which a reduction reaction of the protons and the electrons independently moved from the anode 12 with oxygen contained in air provided by the air supply device 80 takes place, producing electrical energy and water.

The anode 12 may be connected to a hydrogen supply line 130, and have a hydrogen inlet 14 through which the hydrogen passing through the hydrogen supply line 130 is introduced, and a hydrogen outlet 15 connected to a hydrogen recirculation line 140 and discharging the hydrogen having passed through the anode 12. Here, the hydrogen recirculation line 140 may connect the hydrogen outlet 15 to the hydrogen supply line 130 to deliver the hydrogen discharged from the anode 12 through the hydrogen outlet 15 to the hydrogen supply line 130. Thus, the hydrogen supplied by the hydrogen supply device 30 and the hydrogen re-circulated by the hydrogen recirculation line 140 may be introduced to the hydrogen inlet 14.

The cathode 13 may be connected to an air supply line 150, and have an air inlet 16 through which the air is introduced, and a moist air outlet 17 connected to a moist air discharge line 160 and discharging moist air that is a mixture of the air having passed through the cathode 13 and the water produced in the cathode 13. Here, the air supply line 150 includes a first air supply line 152 connecting the atmosphere to an air inlet 111 of the humidifier 110, and a second air supply line 154 connecting an air outlet 113 of the humidifier 110 to the air inlet 16 of the cathode 13. In addition, the moist air discharge line 160 includes a first moist air discharge line 162 connecting the moist air outlet 17 of the cathode 13 to a moist air inlet 115 of the humidifier 110, and a second moist air discharge line 164 connecting a moist air outlet 117 of the humidifier 110 to the outside. Thus, the air humidified by the humidifier 110 and passing through the second air supply line 154 may be introduced into the air inlet 16, and the moist air may be discharged from the moist air outlet 17 to the first moist air discharge line 162.

The stack enclosure 20 may have the interior space 22, in which the stack 10 is accommodated, and a communication hole 24 allowing the interior space 22 to communicate with the atmosphere, and be provided with a vent pipe 26 allowing the interior space 22 to communicate with the air filter 90 to be described later.

The interior space 22 may accommodate the stack 10 in a manner such that an internal surface of the interior space 22 is spaced apart from an external surface of the stack 10 by a predetermined gap. The gap between the internal surface of the interior space 22 and the external surface of the stack 10 may be filled with condensed water (condensate) formed on the external surface of the stack 10, a gas leaking from the stack 10, air in the atmosphere introduced to the interior space 22 through the communication hole 24, and the like.

The communication hole 24 may be formed to pass through a sidewall of the stack enclosure 20 to allow the interior space 22 to communicate with the atmosphere. The communication hole 24 may be formed in a lower sidewall of the stack enclosure 20, but is not limited thereto. The communication hole 24 may guide the air in the atmosphere to the interior space 22, and adjust an internal pressure of the interior space 22 to an atmospheric pressure state.

The vent pipe 26 may be provided to allow the interior space 22 to communicate with an inlet of an air compressor 82. For example, as illustrated in FIG. 1, the vent pipe 26 may be provided to connect the interior space 22 to the air filter 90. The vent pipe 26 may be connected to an upper portion of the interior space 22, but is not limited thereto. Due to the configuration of the vent pipe 26, when the air compressor 82 is driven, a negative pressure acting on the air filter 90 may be transmitted to the interior space 22 through the vent pipe 26. Then, the leaking gas, the condensed water, and the air contained in the interior space 22 may be sucked by the negative pressure and delivered to the air filter 90 through the vent pipe 26. The leaking gas and the other substances delivered to the air filter 90 may sequentially pass through the air supply line 150, the air compressor 82, the humidifier 110, and the second moist air discharge line 164 to be discharged to the outside.

The hydrogen supply device 30 includes a hydrogen storage tank 32 in which hydrogen is stored. The hydrogen storage tank 32 may be connected to the hydrogen inlet 14 of the anode 12 through the hydrogen supply line 130, and supply hydrogen that is required to produce electricity in the stack 10. The hydrogen supplied from the hydrogen storage tank 32 may flow through the hydrogen supply line 130 and be introduced into the hydrogen inlet 14 of the anode 12.

The hydrogen supply valve 40 may be disposed in the hydrogen supply line 130, and adjust the degree of opening thereof to adjust an amount of hydrogen to be supplied to the anode 12.

The purge valve 50 may be provided to discharge the hydrogen passing through the hydrogen recirculation line 140 to the outside. To this end, the hydrogen recirculation line 140 may be connected to the moist air discharge line 160 through the hydrogen purge line 170, and the purge valve 50 may be disposed in the hydrogen purge line 170 to open and close the hydrogen purge line 170. When a predetermined hydrogen purge condition is satisfied, the purge valve 50 may selectively open the hydrogen purge line 170. The hydrogen purge condition is not particularly limited. For example, the hydrogen purge condition may be determined based on whether $H_2$ concentration measured in the anode 12 is higher than or equal to a predetermined reference concentration. When the hydrogen purge line 170 is opened by the purge valve 50, the hydrogen and other gases passing through the hydrogen recirculation line 140 may be delivered to the moist air discharge line 160 through the hydrogen purge line 170, and then discharged together with the moist air to the outside through the moist air discharge line 160.

The water trap 60 may be disposed in a condensate discharge line 180 connected to the hydrogen recirculation line 140. Here, one end of the condensate discharge line 180 may be connected to the hydrogen recirculation line 140, and the other end thereof may be connected to a condensate inlet 119 of the humidifier 110. Thus, the condensate flowing with the hydrogen through the hydrogen recirculation line 140 may be introduced into the condensate discharge line 180 and be then stored in the water trap 60.

The condensate discharge valve 70 may be disposed in the condensate discharge line 180 to be positioned on the downstream side of the condensate discharge line 180 in relation to the water trap 60. The condensate discharge valve 70 may selectively open and close the condensate discharge line 180 depending on the level of condensate stored in the water trap 60. When the condensate discharge line 180 is opened by the condensate discharge valve 70, the condensate stored in the water trap 60 may be delivered to the interior space of the humidifier 110 through the condensate discharge line 180 and then may exchange moisture with the air delivered to the humidifier 110 through the first air supply line 152.

The air supply device 80 may be disposed in the first air supply line 152 and be provided with the air compressor 82 pumping the air in the atmosphere to supply the air. The air supplied by the air compressor 82 may flow through the first air supply line 152, be humidified by the humidifier 110, and flow through the second air supply line 154 into the air inlet 16 of the cathode 13.

The air filter 90 may be disposed in the first air supply line 152 to be positioned on the upstream side of the first air supply line 152 in relation to the air compressor 82. The air filter 90 may be connected to the interior space 22 of the stack enclosure 20 through the vent pipe 26. The air filter 90 may filter the harmful particulates and gaseous contaminants in the air sucked from the atmosphere and the air sucked from the interior space 22 by the negative pressure provided by the air compressor 82.

The air supply valve 100 may be disposed in the first air supply line 152, and adjust the degree of opening thereof to adjust an amount of air to be supplied to the cathode 13.

The humidifier 110 may be a hollow fiber membrane humidifier able to humidify the air through the moisture exchange between the air supplied by the air compressor 82 and the moist air discharged from the cathode 13. The humidifier 110 may have the air inlet 111 connected to the first air supply line 152, the air outlet 113 connected to the second air supply line 154, the moist air inlet 115 connected to the first moist air discharge line 162, the moist air outlet 117 connected to the second moist air discharge line 164, and the condensate inlet 119 connected to the condensate discharge line 180. After humidifying the air through the moisture exchange with the air introduced through the air inlet 111 with the moist air introduced through the moist air inlet 115 and the condensate introduced through the condensate inlet 119, the humidifier 110 may discharge the air through the air outlet 113 and discharge the moist air through the moist air outlet 117.

The air discharge valve 120 may be disposed in the second moist air discharge line 164, and adjust the degree of opening thereof to adjust a discharge amount of the moist air discharged from the moist air outlet 17 and the hydrogen and other gases delivered from the hydrogen purge line 170.

Figure 2:
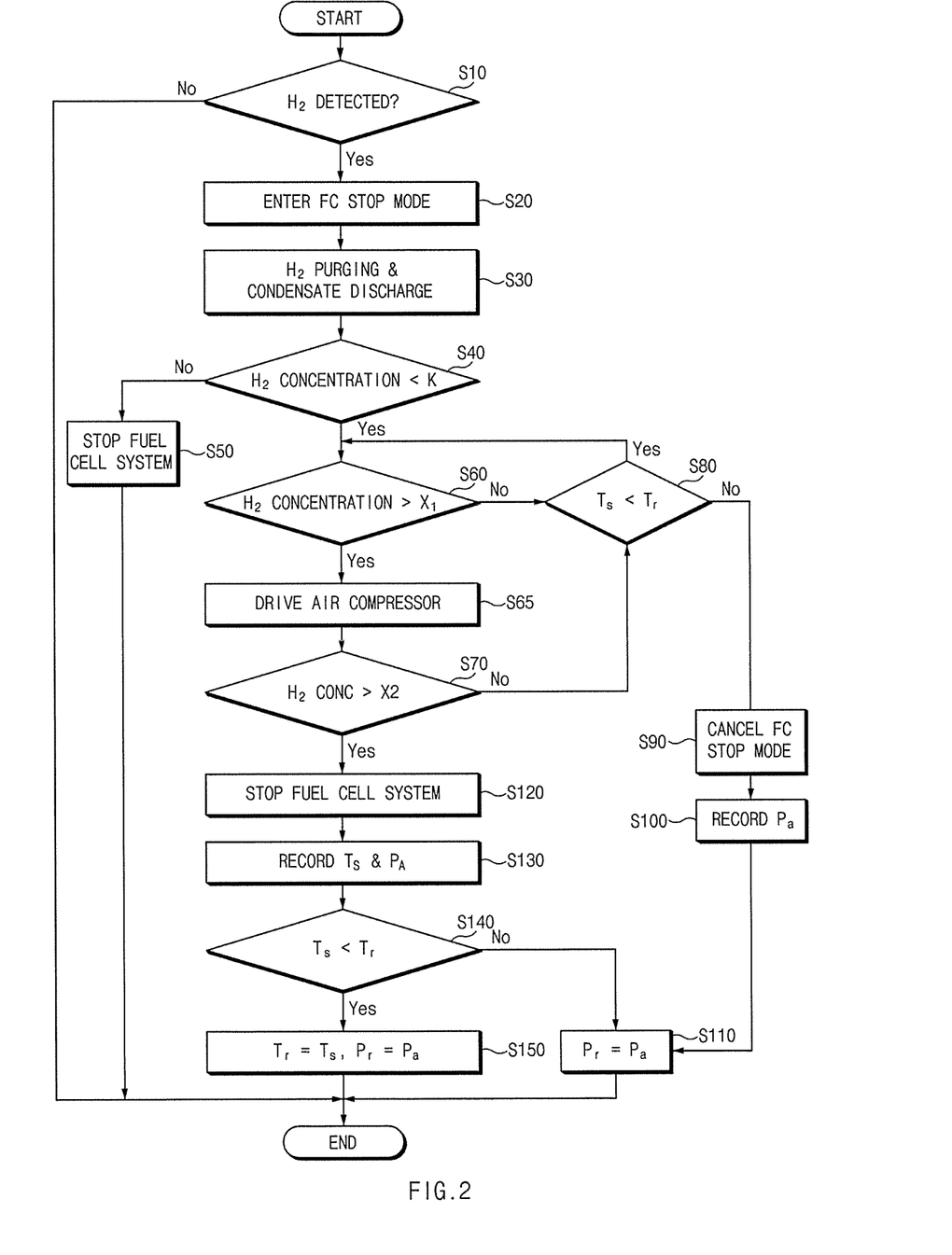
FIG. 2 illustrates a flowchart of a method for controlling a fuel cell system, according to exemplary embodiments of the present disclosure.

FIG. 2 illustrates a flowchart of a method for controlling a fuel cell system, according to exemplary embodiments of the present disclosure.

Referring to FIG. 2, the fuel cell system control method, according to exemplary embodiments of the present disclosure, includes step S10 of determining whether hydrogen ($H_2$) is detected in the interior space 22 of the stack enclosure 20 in which the stack 10 is accommodated during the operation of the fuel cell system 1, step S20 of stopping power generation that is performed using the stack 10 when it is determined in step S10 that the hydrogen is detected; step S30 of opening the purge valve 50 to discharge gases circulating in the anode 12 and opening the condensate discharge valve 70 to discharge condensate stored in the water trap 60; and step S40 of determining whether the hydrogen discharged through the purge valve 50 and the condensate discharge valve 70 in step S30 flows back to the interior space 22 of the stack enclosure 20 based on measured $H_2$ concentration in the interior space 22 of the stack enclosure 20.

First of all, it may be determined in step S10 whether hydrogen is detected in the interior space 22 of the stack enclosure 20 a predetermined number of times or more for a predetermined detection time using a hydrogen sensor (not shown) provided in the stack enclosure 20.

Next, in step S20, the supply of hydrogen to the anode 12 may be stopped by closing the hydrogen supply valve 40, the purge valve 50 and the condensate discharge valve 70, and the supply of air to the cathode 13 may be stopped by closing the air supply valve 100 and the air discharge valve 120 and stopping the air compressor 82, and thus the fuel cell (FC) system may enter an FC STOP mode in which the power generation using the stack 10 is stopped.

Thereafter, in step S30, the purge valve 50 may be opened to purge the hydrogen, and the condensate discharge valve 70 may be opened to discharge the condensate. Here, the hydrogen purging refers to an operation of opening the purge valve 50 to discharge the gases circulating in the anode 12 through the purge valve 50, and the condensate discharge refers to an operation of opening the condensate discharge valve 70 to discharge the condensate stored in the water trap 60 through the condensate discharge valve 70. In step S30, the purge valve 50 may be intermittently opened a predetermined number of times, and the condensate discharge valve 70 may be intermittently opened a predetermined number of times. The opening time and opening degree of the purge valve 50 may be determined according to $H_2$ concentration measured in the anode 12, and the opening time and opening degree of the condensate discharge valve 70 may be determined according to the level of condensate in the water trap 60, but are not limited thereto.

Then, it may be determined in step S40 whether the $H_2$ concentration measured in the interior space 22 of the stack enclosure 20 is lower than a predetermined dangerous concentration K where K is a number.

The predetermined dangerous concentration K refers to a $H_2$ concentration sufficient to determine that the backflow of the hydrogen discharged from the purge valve 50 and the condensate discharge valve 70 during the hydrogen purging and the condensate discharge into the interior space 22 of the stack enclosure 20 is definitely occurring. The predetermined dangerous concentration K may be set to be lower than an ignitable concentration with respect to a hydrogen ignition probability.

When it is determined in step S40 that the measured $H_2$ concentration is higher than or equal to the predetermined dangerous concentration K, it may be determined that the backflow of the hydrogen discharged from the purge valve 50 and the condensate discharge valve 70 in step S30 into the interior space 22 of the stack enclosure 20 is definitely occurring.

The fuel cell system control method further includes step S50 of stopping the fuel cell system 1 when it is determined in step S40 that the measured $H_2$ concentration is higher than or equal to the predetermined dangerous concentration K.

When the fuel cell system 1 continues to operate in a state in which the hydrogen discharged from the purge valve 50 and the condensate discharge valve 70 is flowing back to the interior space 22 of the stack enclosure 20, a regulation on $H_2$ concentration in the exhaust gases may be violated or the hydrogen is likely to ignite. Thus, when it is determined that the measured $H_2$ concentration is higher than or equal to the predetermined dangerous concentration K, the fuel cell system 1 may be stopped to fundamentally eliminate the probability of additional backflow of hydrogen or ignition of hydrogen. For example, when the fuel cell system 1 is mounted in a fuel cell vehicle, the vehicle may be driven by a motor (not shown) using power supplied from a battery (not shown) after the stopping of the fuel cell system 1.

Step S50 may be performed by warning that the measured $H_2$ concentration is higher than or equal to the predetermined dangerous concentration K, using at least one of display devices provided in an apparatus equipped with the fuel cell system 1. Types of display devices are not particularly limited. For example, when the fuel cell system 1 is mounted in a fuel cell vehicle, the display devices may be an alarm, a warning lamp, a display unit, and the like.

When it is determined in step S40 that the measured $H_2$ concentration is lower than the predetermined dangerous concentration K, it may be determined that at least one of the backflow of the hydrogen discharged from the purge valve 50 and the condensate discharge valve 70 in step S30 into the interior space 22 of the stack enclosure 20 or the direct leakage of the hydrogen contained in the stack 10 into the interior space 22 of the stack enclosure 20 is occurring.

Figure 3:
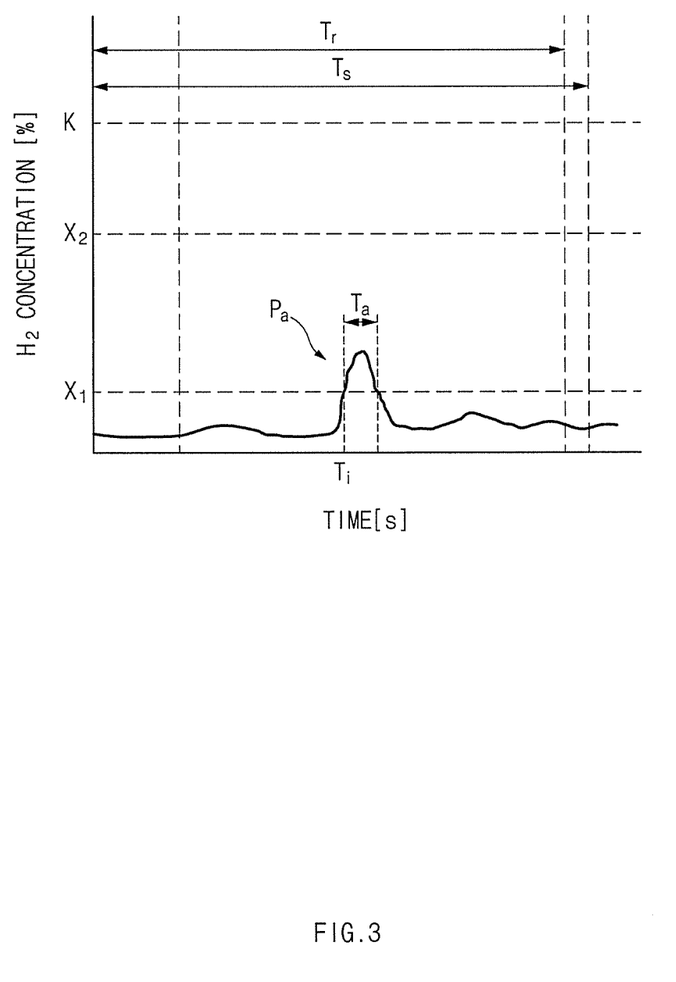
FIG. 3 illustrates a graph showing a state in which a $H_2$ concentration measured in an interior space of a stack enclosure is reduced to lower than or equal to a predetermined safety concentration in step S70.
Figure 4:
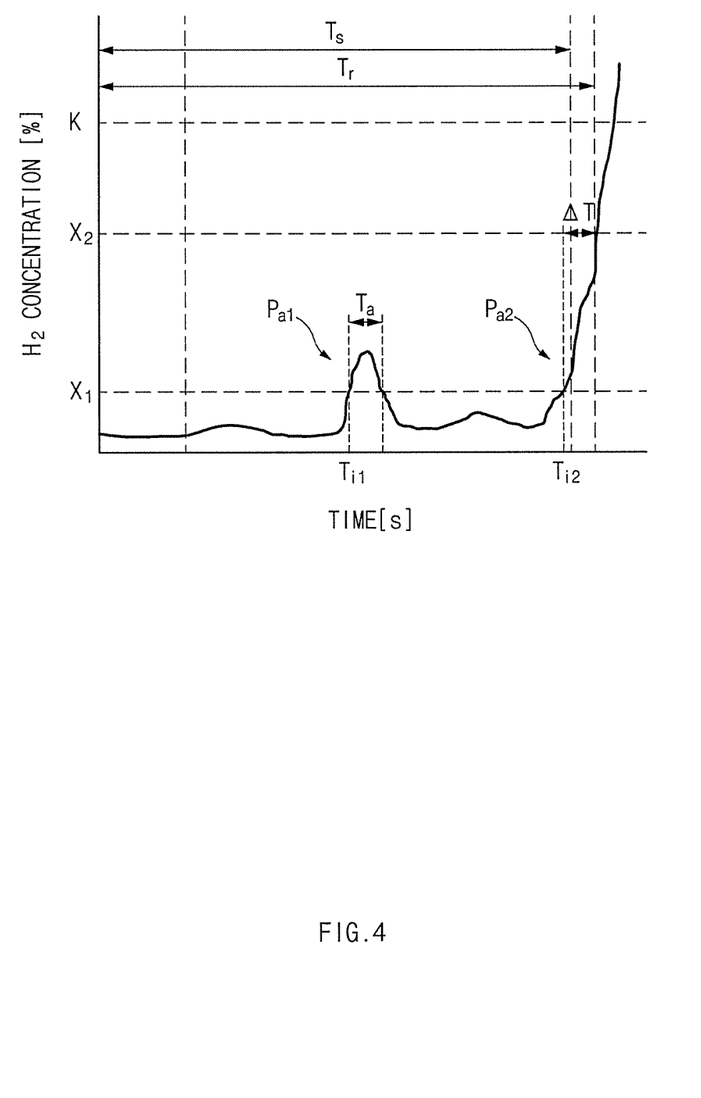
FIG. 4 illustrates a graph showing a state in which a $H_2$ concentration measured in the interior space of the stack enclosure is increased to higher than or equal to a predetermined boundary concentration in step S70.

FIG. 3 illustrates a graph showing a state in which $H_2$ concentration measured in the interior space of the stack enclosure 20 is reduced to lower than or equal to a predetermined safety concentration in step S70, and FIG. 4 illustrates a graph showing a state in which $H_2$ concentration measured in the interior space of the stack enclosure 20 is increased to be higher than or equal to a predetermined boundary concentration in step S70.

The fuel cell system control method includes step S60 of determining whether the measured $H_2$ concentration exceeds a predetermined safety concentration $X_1$ when it is determined in step S40 that the measured $H_2$ concentration is lower than the predetermined dangerous concentration K; step S65 of limitedly driving the air compressor 82 within a predetermined reference driving time $T_a$ to allow the hydrogen to be discharged from the interior space 22 of the stack enclosure 20 due to the negative pressure provided by the air compressor 82 and step S70 of determining whether the measured $H_2$ concentration exceeds a predetermined boundary concentration $X_2$ when it is determined in step S60 that the measured $H_2$ concentration exceeds the predetermined safety concentration $X_1$; and step S80 of determining whether an actual power generation stop time $T_s$ taken from the beginning of step S20 to the present time is less than a predetermined reference power generation stop time $T_r$ when it is determined in step S60 that the measured $H_2$ concentration is lower than or equal to the predetermined safety concentration $X_1$ or when it is determined in step S70 that the measured $H_2$ concentration is lower than or equal to the predetermined boundary concentration $X_2$.

It may be determined in step S60 whether the measured $H_2$ concentration exceeds the predetermined safety concentration $X_1$ using the hydrogen sensor.

Referring to FIG. 3, the predetermined safety concentration $X_1$ may be lower than the predetermined dangerous concentration K by a predetermined ratio. The predetermined safety concentration $X_1$ refers to a $H_2$ concentration sufficient to stably operate the fuel cell system 1, without a risk of ignition, even when the hydrogen is detected using the hydrogen sensor.

When it is determined in step S60 that the measured $H_2$ concentration exceeds the predetermined safety concentration $X_1$, it may be determined that there is a high probability that the backflow of the hydrogen discharged from the purge valve 50 and the condensate discharge valve 70 in step S30 into the interior space 22 of the stack enclosure 20 is occurring.

When it is determined in step S60 that the measured $H_2$ concentration is lower than or equal to the predetermined safety concentration $X_1$, it may be determined that there is a high probability that the backflow of the hydrogen discharged from the purge valve 50 and the condensate discharge valve 70 in step S30 to the interior space 22 of the stack enclosure 20 is not occurring.

Then, when it is determined in step S60 that the measured $H_2$ concentration exceeds the predetermined safety concentration $X_1$, it may be determined in step S70 whether the measured $H_2$ concentration exceeds the predetermined boundary concentration $X_2$ while the air compressor 82 is limitedly being driven within the predetermined reference driving time $T_a$.

Referring to FIG. 3, the predetermined boundary concentration $X_2$ may be higher than the predetermined safety concentration $X_1$ by a predetermined ratio, and may be lower than the predetermined dangerous concentration K by a predetermined ratio. The predetermined boundary concentration $X_2$ refers to a $H_2$ concentration sufficient to determine that the backflow of the hydrogen discharged from the purge valve 50 and the condensate discharge valve 70 in step S30 into the interior space 22 of the stack enclosure 20 occurs at a high probability.

Referring to FIG. 3, the reference driving time $T_a$ may be a time suitable for the suction of the gases contained in the interior space 22 of the stack enclosure 20 to the air filter 90 using the negative pressure action on the interior space 22 of the stack enclosure 20 while driving the air compressor 82.

Referring to FIG. 3, when the measured $H_2$ concentration is not increased to exceed the predetermined boundary concentration $X_2$ for the reference driving time $T_a$ in step S70, it may be determined that there is a probability that the backflow of the hydrogen discharged from the purge valve 50 and the condensate discharge valve 70 into the interior space 22 of the stack enclosure 20 is occurring, but the amount or rate of backflow of hydrogen is suitable to quickly discharge the hydrogen from the interior space 22 of the stack enclosure 20 using the air compressor 82.

Referring to FIG. 4, when the measured $H_2$ concentration is increased to exceed the predetermined boundary concentration $X_2$ in step S70 before the reference driving time $T_a$ elapses, it may be determined that the backflow of the hydrogen discharged from the purge valve 50 and the condensate discharge valve 70 into the interior space 22 of the stack enclosure 20 is definitely occurring, and the amount or rate of backflow of hydrogen is difficult to quickly discharge the hydrogen from the interior space 22 of the stack enclosure 20 using the air compressor 82.

In addition, as illustrated in FIG. 4, when the measured $H_2$ concentration is increased to exceed the predetermined boundary concentration $X_2$ in a state in which a time $\Delta T$ shorter than the reference driving time $T_a$ has elapsed after the driving of the air compressor 82, it may be preferable to immediately stop driving the air compressor 82 and measuring the $H_2$ concentration, without continuing to drive the air compressor 82 and measure the $H_2$ concentration until the reference driving time $T_a$. This will be described later in more detail.

Thereafter, when it is determined in step S60 that the measured $H_2$ concentration is lower than or equal to the predetermined safety concentration $X_1$ or when it is determined in step S70 that the measured $H_2$ concentration is lower than or equal to the predetermined boundary concentration $X_2$, step S80 may be performed by comparing the actual power generation stop time $T_s$ taken from a time at which the power generation is stopped in step S20 to the present time with the reference power generation stop time $T_r$ stored in a data storage medium (not shown).

It may take a predetermined time for the hydrogen discharged from the purge valve 50 and the condensate discharge valve 70 to flow back into the interior space 22 of the stack enclosure 20 during the hydrogen purging and the condensate discharge. Thus, if the measured $H_2$ concentration is only compared with the predetermined safety concentration $X_1$ or the predetermined boundary concentration $X_2$ once, it may be difficult to accurately determine the occurrence or non-occurrence of backflow of hydrogen, the amount of backflow of hydrogen, the rate of backflow of hydrogen, and the like. Therefore, it may be determined in step S80 whether the actual power generation stop time $T_s$ has elapsed for a period of time sufficient to accurately determine the occurrence or non-occurrence of backflow of hydrogen, the amount of backflow of hydrogen, the rate of backflow of hydrogen, and the like by comparing the actual power generation stop time $T_s$ with the reference power generation stop time $T_r$.

When it is determined in step S80 that the actual power generation stop time $T_s$ is less than the reference power generation stop time $T_r$, it may be determined that the actual power generation stop time $T_s$ has not elapsed for a period of time sufficient to accurately determine the occurrence or non-occurrence of backflow of hydrogen, the amount of backflow of hydrogen, the rate of backflow of hydrogen, and the like.

Thus, as illustrated in FIG. 2, when it is determined in step S80 that the actual power generation stop time $T_s$ is less than the reference power generation stop time $T_r$, step S60 may be performed again. Here, when it is determined in step S60 that the measured $H_2$ concentration exceeds the predetermined safety concentration $X_1$, step S70 may be performed again, and when it is determined in step S60 that the measured $H_2$ concentration is lower than or equal to the predetermined safety concentration $X_1$, step S80 may be performed again. Step S60 to step S80 may be repeated a plurality of times until it is determined in step S80 that the actual power generation stop time $T_s$ is greater than or equal to the reference power generation stop time $T_r$ or it is determined in step S70 that the measured $H_2$ concentration exceeds the predetermined boundary concentration $X_2$.

The fuel cell system control method further includes step S90 of restarting the power generation using the stack 10 when it is determined in step S80 that the actual power generation stop time $T_s$ is greater than or equal to the reference power generation stop time $T_r$; step S100 of recording an actual driving time $P_a$ for which the air compressor 82 is driven during the actual power generation stop time $T_s$; and step S110 of storing the actual driving time $P_a$ recorded in step S100 as a reference driving time $P_r$.

In step S90, the supply of hydrogen to the anode 12 may be restarted by opening the hydrogen supply valve 40, and the supply of air to the cathode 13 may be restarted by opening the air supply valve 100 and the air discharge valve 120 and driving the air compressor 82, and thus the entry into the FC STOP mode may be cancelled. Step S90 may take into consideration a low probability of additional backflow of hydrogen into the interior space 22 of the stack enclosure 20 when the measured $H_2$ concentration does not exceed the predetermined boundary concentration $X_2$ until the actual power generation stop time $T_s$ is greater than or equal to the reference power generation stop time $T_r$.

Then, step S100 may be performed by recording a time $T_i$ at which the driving of the air compressor 82 is started during the actual power generation stop time $T_s$. As illustrated in FIG. 3, since the air compressor 82 is driven for the predetermined reference driving time $T_a$ in step S70, the actual driving time $P_a$ may be determined by specifying the time $T_i$ at which the driving of the air compressor 82 is started during the actual power generation stop time $T_s$, that is, the time at which step S90 is started. In addition, as illustrated in FIG. 4, when the air compressor 82 is driven a plurality of times during the actual power generation stop time $T_s$ as step S70 is repeated a plurality of times, a plurality of actual driving times $P_{a1}$ and $P_{a2}$ may be determined by specifying a plurality of points $T_{i1}$ and $T_{i2}$ in time at which the driving of the air compressor 82 is started, respectively. In step S100, the specified actual driving time $P_a$ may be recorded.

Meanwhile, when the air compressor 82 is not driven because the measured $H_2$ concentration is not increased to be higher than or equal to the predetermined safety concentration $X_1$ until the actual power generation stop time $T_s$ has elapsed, it may be recorded that a cause of hydrogen detected in the interior space of the stack enclosure 20 is irrelevant to the backflow of hydrogen, instead of recording the actual driving time $P_a$. When the measured $H_2$ concentration is lower than the predetermined safety concentration $X_1$ until the actual power generation stop time $T_s$ has elapsed, it may be determined that the hydrogen is directly leaked from the stack 10, but is not limited thereto.

Thereafter, in step S110, the actual driving time $P_a$ recorded in step S100 may be stored as the reference driving time $P_r$ in the data storage medium (not shown) of the fuel cell system 1. When it is necessary to activate the FC STOP mode later during the operation of the fuel cell system 1, the air compressor 82 may be driven for a period of time corresponding to the reference driving time $P_r$ in the FC STOP mode. Thus, the measured $H_2$ concentration may be prevented from being increased to be higher than or equal to the predetermined boundary concentration $X_2$ when the hydrogen purging and the condensate discharge are performed in the FC STOP mode.

The fuel cell system control method further includes step S120 of stopping the fuel cell system 1 when it is determined in step S70 that the measured $H_2$ concentration exceeds the predetermined boundary concentration $X_2$; step S130 of individually recording the actual power generation stop time $T_s$ and the actual driving time $P_a$; step S140 of determining whether the actual power generation stop time $T_s$ recorded in step S130 is less than the reference power generation stop time $T_r$; and step S150 of storing the actual power generation stop time $T_s$ as the reference power generation stop time $T_r$ and storing the actual driving time $P_a$ as the reference driving time $P_r$, when it is determined in step S130 that the actual power generation stop time $T_s$ is less than the reference power generation stop time $T_r$.

In step S120, the fuel cell system 1 may be stopped to fundamentally eliminate the probability of additional backflow of hydrogen or ignition of hydrogen. For example, when the fuel cell system 1 is mounted in a fuel cell vehicle, the vehicle may be driven by a motor using power supplied from a battery after the stopping of the fuel cell system 1. In addition, step S120 may be performed by warning that the measured $H_2$ concentration is higher than or equal to the predetermined boundary concentration $X_2$, using at least one of display devices provided in an apparatus of the fuel cell vehicle in which the fuel cell system 1 is mounted.

Next, step S130 may be performed by recording the actual power generation stop time $T_s$ taken from the time at which the power generation is stopped in step S20 to the present time, and the actual driving time $P_a$ for which the air compressor 82 is driven during the actual power generation stop time $T_s$.

Thereafter, in step S140, the actual power generation stop time $T_s$ recorded in step S130 may be compared with the reference power generation stop time $T_r$.

Then, when it is determined in step S140 that the actual power generation stop time $T_s$ is less than the reference power generation stop time $T_r$, step S150 may be performed by storing the actual power generation stop time $T_s$ as the reference power generation stop time $T_r$ in the data storage medium and storing the actual driving time $P_a$ as the reference driving time $P_r$ in the data storage medium.

If the actual power generation stop time $T_s$ is less than the reference power generation stop time $T_r$, it may correspond to a case where the measured $H_2$ concentration in step S70 is increased to exceed the predetermined boundary concentration $X_2$ and step S70 is stopped early. Thus, by storing the actual power generation stop time $T_s$ as the reference power generation stop time $T_r$ and reducing the reference power generation stop time $T_r$, when it is necessary to activate the FC STOP mode later during the operation of the fuel cell system 1, the FC STOP mode may be activated for the reduced reference power generation stop time $T_r$. In addition, by storing the actual driving time $P_a$ as the reference driving time $P_r$, when it is necessary to activate the FC STOP mode later during the operation of the fuel cell system 1, the air compressor 82 may be driven for a period of time corresponding to the reference driving time $P_r$ in the FC STOP mode. Thus, the $H_2$ concentration may be prevented from being increased to be higher than or equal to the predetermined boundary concentration $X_2$ when the hydrogen purging and the condensate discharge are performed in the FC STOP mode.

Meanwhile, when it is determined in step S140 that the actual power generation stop time $T_s$ is greater than or equal to the reference power generation stop time $T_r$, step S110 described above may be performed. In other words, the actual driving time recorded in step S130 may only be stored as the reference driving time $P_r$ in the data storage medium, without changing the reference power generation stop time $T_r$. When it is necessary to activate the FC STOP mode later during the operation of the fuel cell system 1, the air compressor 82 may be driven for a period of time corresponding to the reference driving time $P_r$ in the FC STOP mode.

As described above, when the hydrogen is detected in the interior space 22 of the stack enclosure 20 during the operation of the fuel cell system 1, the fuel cell system control method may diagnose the reason why the hydrogen is detected in the interior space 22 of the stack enclosure 20 and the degree of backflow of hydrogen by observing changes in $H_2$ concentration measured in the interior space 22 of the stack enclosure 20 after the hydrogen purging and the condensate discharge. The fuel cell system control method may diagnose the reason why the hydrogen is detected in the interior space 22 of the stack enclosure 20 and the degree of backflow of hydrogen, without the need to disassemble the stack enclosure 20 and the stack 10. Thus, the fuel cell system control method may eliminate the time required for the assembly and disassembly of the stack enclosure 20 and the stack 10, and prevent the occurrence of a secondary failure due to the assembly and disassembly of the stack enclosure 20 and the stack 10.

In addition, the fuel cell system control method may quickly remove the hydrogen flowing back to the interior space 22 of the stack enclosure 20 using the air compressor 82, thereby maintaining the $H_2$ concentration in the interior space of the stack enclosure to an appropriate level which does not violate the regulation. Thus, the fuel cell system control method may reduce the frequency of stopping the fuel cell system 1 due to an increase in $H_2$ concentration in the interior space 22 of the stack enclosure 20, thereby improving the operation stability of the fuel cell system 1 and an apparatus equipped with the fuel cell system 1, and fundamentally eliminating the probability of hydrogen ignition to prevent safety accidents.

In addition, the fuel cell system control method may diagnose the reason why the hydrogen is detected in the interior space 22 of the stack enclosure 20 and the degree of backflow of hydrogen by using the general components of the fuel cell system 1, thereby contributing to the cost reduction of the fuel cell system 1.

The method for controlling a fuel cell system, according to exemplary embodiments of the present disclosure, may have the following effects.

First, the reason why hydrogen is detected in the interior space of the stack enclosure and the degree of backflow of hydrogen may be diagnosed, without the need to disassemble the stack enclosure and the stack. Thus, the fuel cell system control method may eliminate the time required for the assembly and disassembly of the stack enclosure and the stack, and prevent the occurrence of a secondary failure due to the assembly and disassembly of the stack enclosure and the stack.

Second, the hydrogen flowing back to the interior space of the stack enclosure may quickly be removed using the air compressor, and thus the $H_2$ concentration in the interior space of the stack enclosure may be maintained to an appropriate level which does not violate the regulation.

Third, the reason why the hydrogen is detected in the interior space of the stack enclosure and the degree of backflow of hydrogen may be diagnosed using general components of the fuel cell system. Thus, the fuel cell system control method may contribute to the cost reduction of the fuel cell system.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for controlling a fuel cell system, the method comprising steps of:
   (a) determining whether hydrogen ($H_2$) is detected in an interior space of a stack enclosure in which a fuel cell stack is accommodated;
   (b) stopping power generation that is performed using the stack when it is determined in step (a) that the hydrogen is detected;
   (c) opening a purge valve to discharge gases circulating in an anode through the purge valve, and opening a condensate discharge valve to discharge condensate contained in a water trap through the condensate discharge valve; and
   (d) determining whether the hydrogen discharged through at least one of the purge valve and the condensate discharge valve in step (c) flows back to the interior space based on $H_2$ concentration measured in the interior space.

2. The method according to claim 1, wherein step (a) is performed by determining whether the hydrogen is detected a predetermined number of times or more.

3. The method according to claim 1, wherein step (b) is performed by stopping supply of the hydrogen to the anode and stopping supply of air to a cathode.

4. The method according to claim 1, wherein step (c) is performed by intermittently opening the purge valve a predetermined number of times, and intermittently opening the condensate discharge valve a predetermined number of times.

5. The method according to claim 4, wherein step (d) is performed by determining whether the $H_2$ concentration is lower than a predetermined dangerous concentration.

6. The method according to claim 5, further comprising step (e) of stopping the fuel cell system when it is determined in step (d) that the measured $H_2$ concentration is higher than or equal to the predetermined dangerous concentration.

7. The method according to claim 6, wherein step (e) is performed by warning that the measured $H_2$ concentration is higher than or equal to the predetermined dangerous concentration, using at least one of display devices provided in the fuel cell system.

8. The method according to claim 5, further comprising step (f) of determining whether the measured $H_2$ concentration exceeds a predetermined safety concentration when it is determined in step (d) that the measured $H_2$ concentration is lower than the predetermined dangerous concentration,
   wherein the predetermined safety concentration is lower than the predetermined dangerous concentration by a predetermined ratio.

9. The method according to claim 8, further comprising step (g) of determining whether the measured $H_2$ concentration exceeds a predetermined boundary concentration while limitedly driving an air compressor within a predetermined reference driving time to allow the hydrogen to be discharged from the interior space due to a negative pressure provided by the air pressure when it is determined in step (f) that the measured $H_2$ concentration exceeds the predetermined safety concentration,
   wherein the predetermined boundary concentration is higher than the predetermined safety concentration by a predetermined ratio, and is lower than the predetermined dangerous concentration by a predetermined ratio.

10. The method according to claim 9, further comprising step (h) of determining whether an actual power generation stop time taken from the beginning of step (b) to the present time is less than a predetermined reference power generation stop time when it is determined in step (f) that the measured $H_2$ concentration is lower than or equal to the predetermined safety concentration or when it is determined in step (g) that the measured $H_2$ concentration is lower than or equal to the predetermined boundary concentration,
    wherein step (f) is performed again when it is determined in step (h) that the actual power generation stop time is less than the reference power generation stop time.

11. The method according to claim 10, further comprising step (i) of restarting the power generation that is performed using the stack when it is determined in step (h) that the actual power generation stop time is greater than or equal to the reference power generation stop time.

12. The method according to claim 11, further comprising step (j) of recording an actual driving time for which the air compressor is driven during the actual power generation stop time, after step (i).

13. The method according to claim 12, further comprising step (k) of storing the actual driving time recorded in step (j) as a reference driving time.

14. The method according to claim 9, further comprising step (l) of stopping the fuel cell system when it is determined in step (g) that the measured $H_2$ concentration exceeds the predetermined boundary concentration.

15. The method according to claim 14, further comprising step (m) of individually recording an actual power generation stop time taken from the beginning of step (b) to the present time, and an actual driving time for which the air compressor is driven during the actual power generation stop time, after step (l).

16. The method according to claim 15, further comprising steps of:
    (n) determining whether the actual power generation stop time recorded in step (m) is less than a predetermined reference power generation stop time; and
    (o) storing the actual power generation stop time as the reference power generation stop time, and storing the actual driving time as a reference driving time, when it is determined in step (n) that the actual power generation stop time is less than the reference power generation stop time.

17. The method according to claim 16, further comprising step (p) of storing the actual driving time as the reference driving time when it is determined in step (n) that the actual power generation stop time is greater than or equal to the reference power generation stop time.

18. The method according to claim 2, wherein the determining whether the hydrogen is detected is performed for a predetermined detection time using a hydrogen sensor provided in the stack enclosure.

19. The method according to claim 4, wherein:
    opening time and opening degree of the purge valve is determined according to the $H_2$ concentration measured in the anode, and
    opening time and opening degree of the condensate discharge valve is determined according to a level of the condensate in the water trap.

20. The method according to claim 5, wherein the predetermined dangerous concentration is set to be lower than an ignitable concentration with respect to a hydrogen ignition probability.

* * * * *